United States Patent [19]

Foch et al.

[11] Patent Number: 4,567,553
[45] Date of Patent: Jan. 28, 1986

[54] STATIC SEMI-CONDUCTOR ELECTRICAL ENERGY CONVERTER ASSEMBLY

[75] Inventors: Henri Foch; Jacques Roux, both of Toulouse, France

[73] Assignee: Agence Nationale pour la Valorisation et la Recherche (A.N.V.A.R.), Paris, France

[21] Appl. No.: 523,193

[22] Filed: Aug. 15, 1983

[30] Foreign Application Priority Data

Aug. 16, 1982 [FR] France ............................... 82 14249

[51] Int. Cl.[4] ............................................ H02P 13/20
[52] U.S. Cl. ...................................... 363/98; 363/132; 323/271
[58] Field of Search .................... 363/41–43, 363/98, 131–132, 71–72; 323/271

[56] References Cited

U.S. PATENT DOCUMENTS

| | | | |
|---|---|---|---|
| 3,373,338 | 3/1968 | Corey et al. | 363/71 |
| 3,409,818 | 11/1968 | Gillett | 363/71 |
| 4,117,364 | 9/1978 | Baker | 318/230 |
| 4,162,523 | 7/1979 | Ansorge | 363/43 |
| 4,203,151 | 5/1980 | Baker | 363/43 |
| 4,270,163 | 5/1981 | Baker | 363/132 X |
| 4,330,819 | 5/1982 | Foch et al. | 363/132 |

FOREIGN PATENT DOCUMENTS

1417741 10/1965 France.
2437103 9/1979 France.

Primary Examiner—Peter S. Wong
Attorney, Agent, or Firm—Sandler & Greenblum

[57] ABSTRACT

A static conversion assembly comprises a serial connection of n apparatus each formed by the association of two converters (Δ) of the type described in U.S. Pat. No. 4,330,819. Each control stage of a given apparatus (..) is adapted to furnish opposite control signals to the two controlled blocking static interrupters of each apparatus (Δ). In addition, the assembly of control stages of the apparatus (Δ) is driven by a centralized control unit (56) which provides a delay in the control signals of an apparatus (Δ) with respect to the control signals applied to a preceeding apparatus in the serial arrangement thereof. In addition, a voltage distribution stage (51) is connected to the apparatus (..) in order to divide the applied voltage and apply only a fraction thereof to each interrupter.

8 Claims, 16 Drawing Figures

STATIC SEMI-CONDUCTOR ELECTRICAL ENERGY CONVERTER ASSEMBLY

TECHNICAL FIELD

This invention relates to static semi-conductor electrical energy static converters which convert continuous electrical voltages into alternating voltages of predetermined frequency, and more particularly, to an electrical energy static converter of the type described in U.S. Pat. No. 4,330,819, the disclosure of which is herein incorporated by reference.

BACKGROUND ART

The '819 patent discloses a converter (shown in FIG. 1) which eliminates energy losses during switching. The converter uses semi-conductor power components having controlled blocking, which, in the '819 patent, are designated as "power transistors". A more suitable term for these components, which is used hereinafter, is "controlled blocking static interrupters". This designation encompasses all components which meet the following description: (1) a static electronic component having a control electrode (base, trigger grid . . . ) which hereinafter will be designated as "base" (in order to simplify the terminology and by reference to the designation used in the transistors); (2) a power electrode (emitter, source, cathode . . . ), hereinafter designated as "emitter"; and (3) a second power electrode (collector, drain, anode . . . ), hereinafter designated as "collector". Such a static electronic component has two states: a forwardly biased conduction state characterized by a low voltage drop between the collector and the emitter ($V_{CE}$), and a reverse biased blocked state characterized by a low leakage current between emitter and collector. The change of state is under the control of the base electrode, which forwardly or reversely biases the component in accordance with the polarity of signal applied to the component.

Power transistors (bipolar or MOS) meet these criteria, but thyristors or other components also meet these criteria. To increase the voltage range in which the apparatus is utilized (without reducing current performance), transistors having a voltage $V_{CEX}$ greater than that of the voltage $V_{CEO}$, are advantageous as is indicated in the above-mentioned '819 patent. The voltage $V_{CEX}$ is defined as the voltage of the transistor at no collector current when the base is reverse biased, while the voltage $V_{CEO}$ is defined as the collector emitter voltage with the base open.

Figure 1:
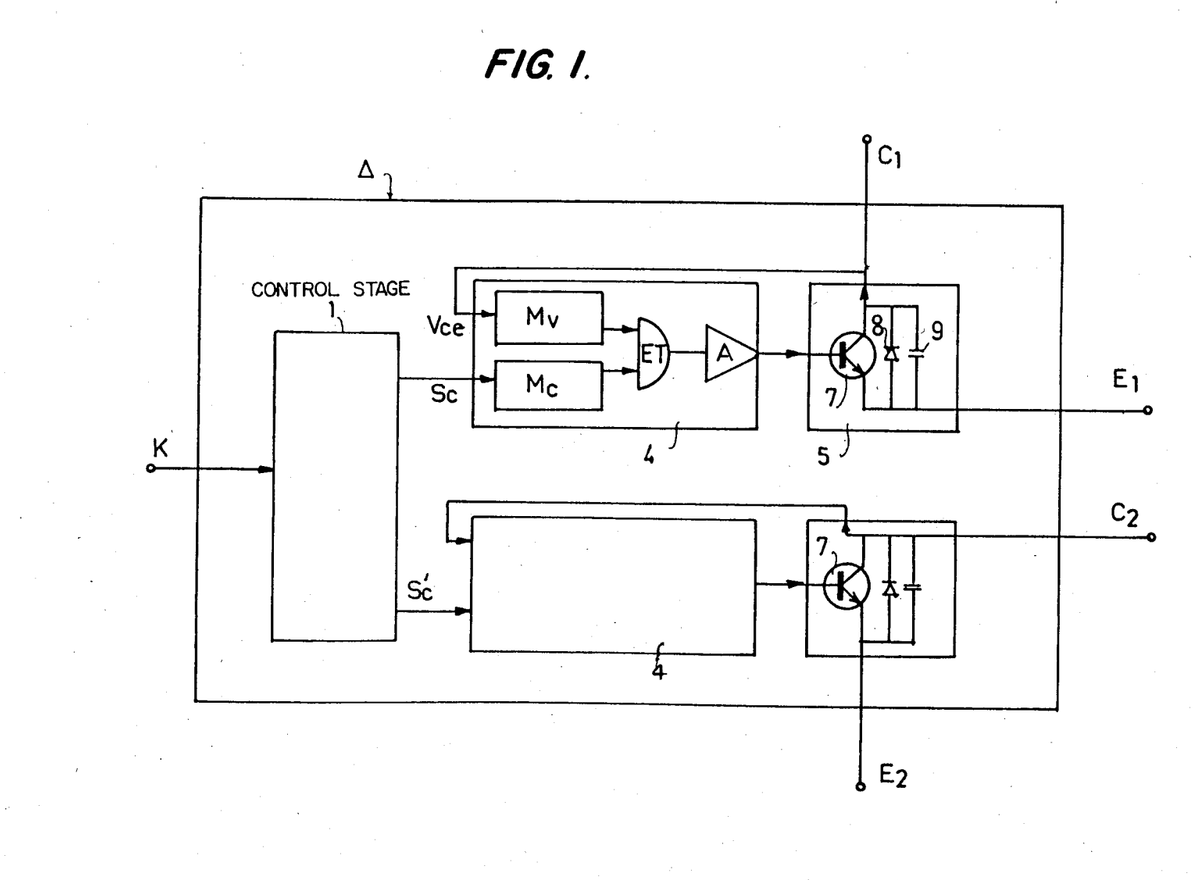
FIG. 1 illustrates converter apparatus ($\Delta$) of the type described.

The converter used with the present invention is shown in detail in FIG. 1 of the '819 patent. It comprises at least one power stage provided with two controlled blocking static interrupters, each having a collector, a base, and an emitter, and with a commutation circuit for shunting collector current from each static interrupter during blocking commutations thereof. The two static interrupters are arranged in a half-bridge rectifier configuration across the power supply terminals (+E,−E).

A control stage is provided for each static interrupter for generating a control signal of appropriate form for the conversion to be performed. Finally, a single processing stage is provided for each static interrupter. Each stage has one input connected to receive the control signal, another input connected to the power stage to detect the collector-emitter voltage $V_{CE}$ of the static interrupter, and an output connected to the base of the static interrupter to trigger the commutations thereof.

One of the signal processing stages will forwardly bias the base of the interrupter when the control signal has a value corresponding to placing the interrupter into conduction, and the voltage $V_{CE}$ on the interrupter is approximately zero. The other signal processing stage will reverse bias the other interrupter in order to block conduction.

In FIG. 1 of the '819 patent, which is hereinafter termed a converter of the type described, power stage 5 is provided with two controlled blocking static interrupters 7, each of which is associated with signal processing stage 4. Control stage 1 delivers a control signal $S_c$ for each static interrupter, the control signal being in the form of a train of pulses that successively produce blocking and unblocking conditions for the static interrupter.

Diode 8 is associated with each static interrupter of the power stage for recuperation of energy and commutation assistance to rapidly reduce the collector current of the static interrupter at the onset of a blocking commutation. This commutation assistance circuit is formed of condenser 9, placed in parallel between the emitter and the collector of the interrupter 7.

According to an embodiment of the converter described in the '819 patent, each intermediate stage 4 may comprise two shaper circuits $M_V$ and $M_C$. Shaper circuit $M_V$ operates on voltage $V_{CE}$ and furnishes a signal in one of either two states, one when the voltage $V_{CE}$ is almost zero, and the other this voltage is different from zero. Shaper circuit $M_C$ operates on the control signal $S_C$ and furnishes a signal in one of either two states, one which places the power transistor into conduction, the other which blocks the control signal. A logic gate connected to the outputs of the two circuits $M_C$ and $M_B$ performs the logic function and with respect to the signals issuing from the shaping circuits so as to furnish a logic commutation signal having two states. An adaptation circuit A is also provided. This circuit is connected to the AND logic gate and to the base of the power transistor for furnishing base current such that conduction of the interrupter is affected for the state ONE which corresponding to the conduction of the static interrupter. The adaptation circuit furnishes a feed current to the base as a function of the signal issuing from the AND logic gate.

The conventional converter apparatus shown in the '819 patent is designated herein by the Greek letter Δ. It has, as shown in FIG. 1 of the '819 patent, four terminals connected to power electrodes of the two static interrupters 7. To simplify the description which follows, the terminal connected to the collector of the first interrupter is designated $C_1$; the terminal connected to the emitter of this first interrupter is designated $E_1$; the terminal connected to the collector of the second interrupter 7 is designated $C_2$; and the terminal connected to the emitter of the second interrupter is designated $E_2$.

The present invention aims at extending the domain of use of this apparatus to greater voltages which can be considerably higher (in particular greater than the voltage which can be supported by each interrupter at its terminals) while benefitting from the specific advantages of the base converter (suppression or reduction of commutation energy losses; advantageously, exploitation of voltage $V_{CEX} > V_{CEO}$ in the case of bipolar transistors).

BRIEF DESCRIPTION OF THE INVENTION

The present invention permits an increase in the level of the input voltage by serially connecting several static interrupters of the type described, and arranging for input voltage to be divided between them so that each is exposed to only a fraction of the input voltage. This idea is, in itself, known in the technical sector and is found in a similar form for example in the sub-assembly of a multiplier voltage apparatus described in U.S. Pat. No. 4,203,151.

However, a simple transposition of the component means of the sub-assembly in the '151 patent does not produce the apparatus of the present invention , nor does such transposition achieve the objectives described above.

In effect, such a transposition permits an increase in the input voltage but fails to enjoy the performance advantage of the base converter of the '819 patent which completely eliminates energy losses during switching between conduction and cut-off states. The simple connecting of interrupters in a series as illustrated in the '151 patent is incompatible with the attainment of a necessary condition for commutations at the level of each of the interrupters namely: spontaneous cancellation of voltage $V_{CE}$ of each interrupter at each cycle such that when this condition is fulfilled, the intermediate processing stage can fulfill its function (condition necessary for attainment of the desired performances) for each cycle. Such function is to effect conduction of an interrupter if, and only if, the following circumstances occur simultaneously: the control signal Sc corresponds to a turn-on signal; and the voltage $V_{CE}$ is approximately zero. In all other cases, conduction is blocked.

Such conditions are completely foreign to the '151 patent which is not concerned with commutation energy losses. Moreover, such conditions would not be evident to persons skilled in the art from information in the '151 patent or from the '819 patent.

The present invention aims to resolve the above-described problem by utilizing static semi-conductor electrical energy converter assembly made from several conventional apparatus Δ which are able to operate with input voltages much higher than can be applied to individual ones of apparatus Δ. This is achieved while benefitting from the specific advantages of the apparatus (Δ) (i.e., by assuring at each cycle, for each of the interrupters of these apparatus, the appropriate commutation conditions and this without risk of incompatibility between the circuits of the diverse apparatus Δ).

The static assembly of the present invention is intended to convert a continuous input voltage (2E) into an alternating voltage with a peak amplitude lower than or equal to this continuous voltage. The assembly, according to the present invention, comprises n apparatus, (where n is greater than or equal to 2) of the type described, serially connected, such that the terminals ($E_1$) and ($C_2$) of a preceeding apparatus are respectively connected to terminals ($C_1$) and ($E_2$) of the succeeding apparatus. The terminals ($C_1$) and ($E_2$) of the first apparatus (Δ) receive the continuous input voltage (2E); and the two terminals ($E_1$) and ($C_2$) of the last apparatus (Δ) are connected together to form a first output terminal ($S_1$) of the assembly for connection to one end of a load. A voltage distribution stage is connected to terminals ($C_1$) and ($E_2$) of the various apparatus (Δ). The two converters of each apparatus (Δ) are controlled in opposition by a common control stage which generates, for each of the two static interrupters of the converters, opposing control signals Sc and S'c in a form appropriate for the conversion to be performed. Each control stage of the various apparatus (Δ) is driven by a centralized control unit that delays the control signals Sc, S'c of succeeding apparatus (Δ) with respect to the control signals Sc, S'c of the preceeding apparatus in the serially connected apparatus.

According to a preferred embodiment, the voltage distribution stage divided the feed voltage 2E into approximately equal n fractions (2E/n) and applies such fraction of the feed voltage to each static interrupter Δ.

The conversion assembly thus made can operate with feed voltages that are considerably higher than previously used because each static interrupter of an apparatus (Δ) has applied to it only a fraction (i.e., 2E/n) of the applied voltage (2E). By a choice appropriate to the number n of apparatus (Δ), it is possible for voltages on the order of several thousand volts to set on each static interrupter a voltage compatible with its voltage; in the case where the static interrupters are power transistors having a voltage $V_{CEX} > V_{CEO}$, it is this voltage $V_{CEX}$ which constitutes the upper voltage limit which is not to be exceeded at the transistor terminals; the exploitation of this property of certain transistors (in particular "reverse Mesa" transistors) allows for a given input voltage (2E), reducing the number n of necessary apparatus.

As will be better understood, the operation of the assembly according to the invention can be described thus:

The central control unit ensures a predetermined sequence in blocking of the first interrupters of the various apparatus (Δ), which gives time for the commutation assistance circuits to cut-off load current of the interrupter during blocking (thereby reducing losses at blocking) and to neutralize the influence of the inevitable small differences in the blocking times of the diverse interrupters (suppression of accidental excess voltage).

One of the functions of the voltage distributor is thus to ensure the continuity of the load current during these step-by-step blockings.

During these step-by-step blockings of the first interrupters, the second interrupters of the various apparatus (Δ) are the origin of the above-described phenomena.

For a given apparatus (Δ), the effective placing in conduction of the second interrupter can appear only after the blocking of the first interrupter (S'c opposite to Sc) and this property is applicable for the assembly of the apparatus (Δ), namely that the effective placing in conduction of the assembly of the second interrupters can only appear after blocking of the totality of the first interrupters. These commutation conditions exclude all risk of the application of an accidental excess voltage to the terminals of any one of the second interrupters (an excess voltage which will be consecutive to a premature activation of one of these second interrupters).

In addition, the voltage $V_{CE}$ of each second interrupter of an apparatus (Δ) changes by the value 2E/n each time the first interrupters of the apparatus switch conduction; thus for each of the second interrupters, the voltage $V_{CE}$ will necessarily attain a null value when all of the first interrupters are blocked (and only in this case).

Of course, to the following half-cycle (or following alteration), the roles of the first and second interrupters are reversed.

Thus, by placing the interrupters in series, and by employing the logic of the operation of each of them, the attainment of specific performances of each of the apparatus is guaranteed.

According to the present invention, a static semiconductor electrical energy converter assembly converts a continuous input voltage into an alternating voltage having a peak-to-peak amplitude lower than or equal to said continuous voltage. The assembly comprises n apparatus ($\Delta$), where (n is greater than or equal to 2), each apparatus being formed by the association of two converters. Each converter comprises at least one power stage having at least one controlled blocking static interrupter with a collector, a base and an emitter, and a commutation assist circuit associated with each static interrupter operative to reduce conduction of its collector current during blocking commutations thereof.

The converter also includes a control stage for generating a control signal Sc for each static interrupter; an intermediate processing stage associated with each static interrupter and having an input connected to the control stage to receive the signal Sc; and another input connected to the power stage to detect a collector-emitter voltage $V_{CE}$ of the static interrupter and an output connected to the base of said static interrupter to trigger the commutations thereof. The intermediate processing stage is adapted to drive the base of said interrupter so as to interrupt conduction in the single case where, at the same time, the control signal Sc has a value corresponding to a placing in conduction, and the voltage $V_{CE}$ is approximately zero whereby reverse polarization of said interrupter base occurs in all other cases in order to block the interrupter.

Each apparatus ($\Delta$) formed by the association of the two above-mentioned converters comprises four power terminals connected to power electrodes of the two static interrupters: collector ($C_1$) and emitter ($E_1$) of the first interrupter and collector ($C_2$) and emitter ($E_2$) of the second interrupter. The n apparatus ($\Delta$) is located in a series such that terminals ($E_1$) and ($C_2$) of an apparatus are respectively connected to terminals ($C_1$) and ($E_2$) of the following apparatus, the two terminals ($C_1$) and ($E_2$) of the first apparatus ($\Delta$) receiving the continuous input voltage, and the two terminals ($E_1$) and ($C_2$) of the last apparatus ($\Delta$) are connected between themselves to form a first output terminal ($S_1$) of the assembly for connection to a load.

A voltage distribution stage is connected to terminals ($C_1$ and $E_2$) of the various apparatus ($\Delta$)) and the two converters of each apparatus ($\Delta$) are controlled in opposition by a common control stage. This stage generates, for the two static interrupters of said converters, opposite control signals (Sc and S'c) of an appropriate form for the conversion to be performed. The control stages of the various apparatus ($\Delta$) are driven by a centralized control unit, adapted to provide a delay in the control signals (Sc, S'c) applied to the apparatus ($\Delta$).

BRIEF DESCRIPTION OF THE DRAWING

The invention will be better understood with reference to the description which follows and the attached drawings, which are given by way of non-limiting example of one embodiment, wherein:

FIGS. 5a through 5k illustrate waveforms at various locations in the circuit of FIG. 4;

DETAILED DESCRIPTION

Figure 2:
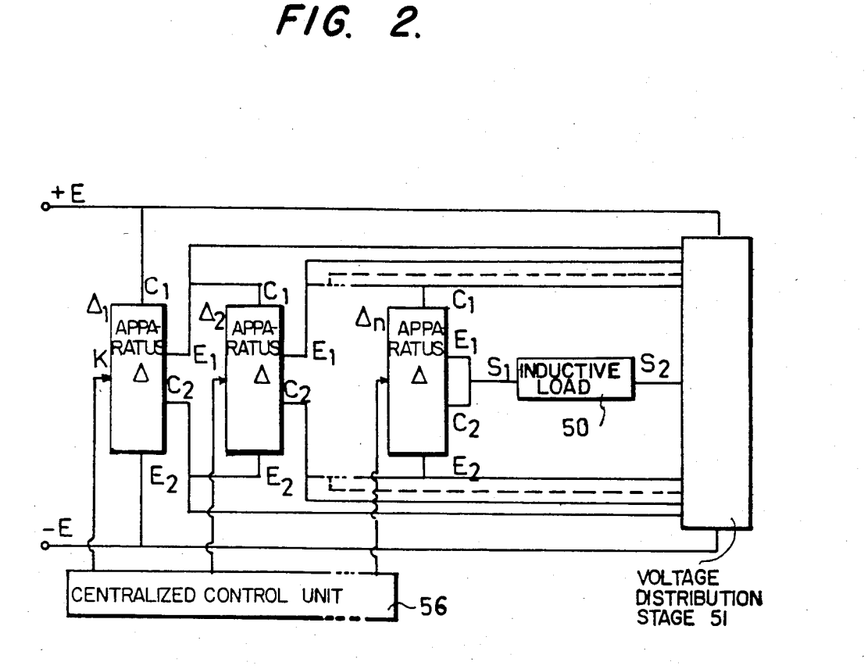
FIG. 2 is a block diagram of conversion apparatus according to the invention.

A conversion assembly, according to the present invention, is represented by way of non-limiting example in FIG. 2. It comprises a serial connection of n apparatus ($\Delta$), each of which is described above and shown in the '819 patent. The first apparatus is designated as ($\Delta_1$) and is connected, on the one hand, by its terminals $C_1$ and $E_2$ respectively to $+E$ and $-E$ terminals of a power supply, and on the other hand, by its terminals $E_1$ and $C_2$ respectively to terminals $C_1$ and $E_2$ of the second apparatus designated by ($\Delta_2$).

In a general manner, terminals $E_1$ and $C_2$ of the ith apparatus ($\Delta_i$) are respectively connected to terminals $C_1$ and $E_2$ of the succeeding apparatus ($\Delta_{i+1}$).

The last apparatus ($\Delta_n$) has its two terminals $E_1$ and $C_2$ joined to form a first output terminal $S_1$ to which one end of inductive load 50 is attached.

Voltage distribution stage 51 is connected to terminals $C_1$ and $E_2$ of the various converters ($\Delta_1$) to ($\Delta_n$), and provides a terminal $S_2$ to which is connected the other end of the load.

In addition, the control inputs K of each apparatus ($\Delta$) are connected to centralized control unit 56 which is adapted to delay the controls Sc and S'c of the various apparatus ($\Delta$) as illustrated in FIGS. 5a through 5e. Such a control unit can be made electronically by analog or numeric means; an analog embodiment is described later with reference to FIGS. 6 and 7.

Figure 3:
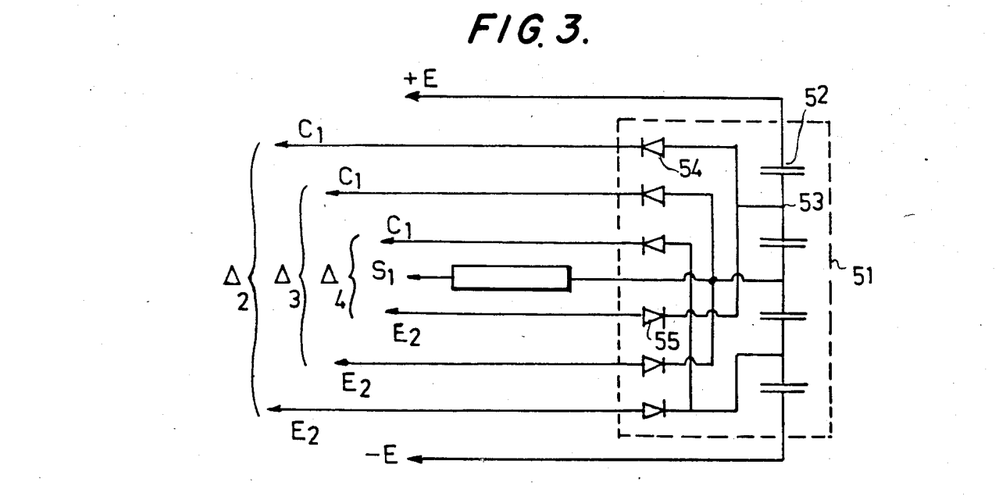
FIG. 3 is a circuit diagram of one of the subassemblies of FIG. 2.

Stage 51 may be constructed as illustrated in FIG. 3 using a series of capacitors 52 serially connected in a ladder configuration across the power supply whereby the voltage 2E is applied to the capacitors and divided at nodes 53 between the capacitors. An assembly of diodes 54, 55 connects nodes 53 to the various power electrodes $C_1$ and $E_2$ of the interrupters (which in the example are represented as being power transistors). Thus, the voltage distribution furnished by the ladder configuration of capacitors is applied these interrupters.

The number of capacitors 52 are at least equal to the number n of apparatus ($\Delta$). As shown in FIG. 3, these are four capacitors and four apparatus ($\Delta$). Thus, there are at least (n−1) intermediate connections 53.

These capacitors are of approximately equal value, and are selected such that their impedance, at the switching frequency of the apparatus ($\Delta$), will be negligible with respect to the impedance of the load. Thus, the capacitors divide the power supply voltage into n approximately equal fractions 2E/n.

Diodes 54, 55 are divided in two groups each having (n−1) members. The (n−1) diodes 54 of the first group are connected to (n−1) nodes 53 between the ladder configuration of the capacitors in order to connect the apparatus ($\Delta_2$) ... ($\Delta_n$) to terminals $C_1$ except for apparatus ($\Delta_1$). They are poled such that their anodes are connected to nodes 53, and their cathodes are connected to terminals $C_1$ of the apparatus.

The $(n-1)$ diodes 55 of the second group are connected to $(n-1)$ nodes 53 between the capacitors in order to connect the apparatus $(\Delta_2),\Delta(_n)$ to terminals $E_2$ except for apparatus $(\Delta_1)$. They are poled such that their cathodes are connected to nodes 53, and their anodes are connected to terminals $E_2$ of the apparatus.

Figures 5A, 5B:
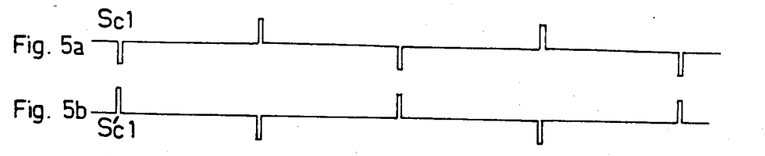
Figures 5C, 5D:
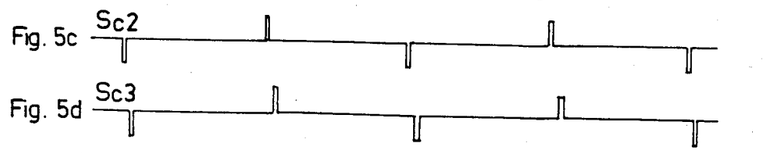
Figures 5E, 5F:
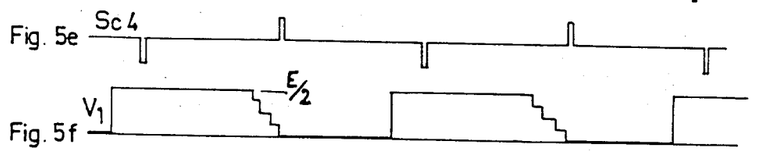
Figure 5G:
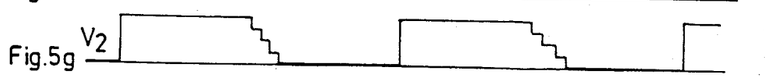
Figure 5H:
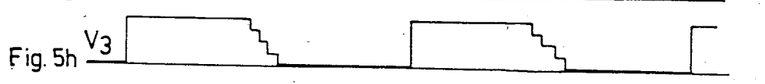
Figure 5J:
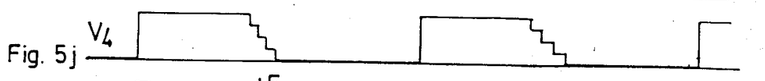
Figure 5K:
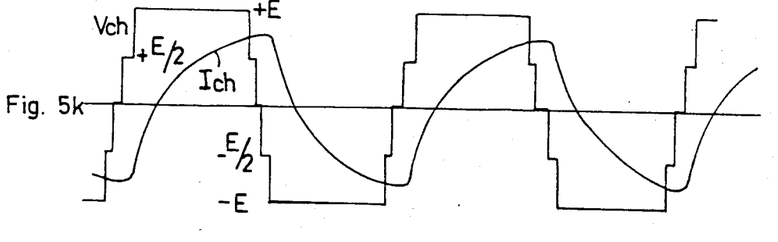

The operation of the assembly is explained below in reference FIG. 4, which shows the circuitry for a conversion assembly comprising four apparatus $(\Delta)$, and in reference to FIGS. 5a through 5k, which show the waveforms at various points in FIG. 4. assembly:

FIG. 5a shows control signal Sc1 which is applied to first transistor of the first apparatus $(\Delta_1)$. FIG. 5b shows control signal S'c1, in time coincident with, but in phase opposition to signal Sc1, which is applied to the second transistor of the first apparatus $(\Delta_1)$. FIGS. 5c, 5d and 5e show, respectively, control signals Sc2, Sc3, and Sc4 of the first transistors of the apparatus $(\Delta_2)$, $(\Delta'_3)$ and $(\Delta_4)$. FIGS. 5f, 5g, 5h and 5j show, respectively, voltages $V_1$, $V_2$, $V_3$ and $V_4$ at terminals $C_1$ and $E_1$ of the first transistors of the four apparatus $(\Delta_1)$, $(\Delta_2)$, $(\Delta'_3)$ and $(\Delta_4)$. FIG. 5k shows voltage $V_{ch}$ across the load, and current $I_{ch}$ through the load.

The assembly operates at a steady state and initially, the first four power transistors (designated in FIG. 4 by $T_1$, $T_2$, $T_3$, $T_4$) conduct. When transistor $T_1$ receives a blocking command, as represented by the leading edge of signal SC1 (FIG. 5a), it ceases conduction causing the voltage $V_1$ at its terminals ($C_1$, $E_1$) to rise. When this voltage reaches the value E/2 (FIG. 5f), corresponding diode 54 is forwardly biased and begins to conduct ensuring continuity of load current.

When transistor $T_2$ receives its blocking command, slightly later than when transistor $T_1$ received its command, as represented by the leading edge of signal $S_{C2}$ (FIG. 5c), this transistor ceases conduction in turn. When the voltage $V_2$ at its terminals reaches the value E/2 (FIG. 5g) corresponding diode 54' is forwardly biased and begins to conduct thus ensuring continuity in load current. This procedure is repeated for the remaining transistors $T_3$ and $T_4$.

During these phases, the voltages at the terminals of the other transistors of the apparatus, $T'_1$ through $T'_4$ progressively subside, in corresponding steps, from E/2 to 0. This sets-up conditions for their subsequent activation.

The commutation mechanism is symmetrical for the following alteration in phase of the control signals. Thus, the voltage of the load at the terminals varies between +E and −E (in the example in pseudo-rectangular fashion) while the voltage at the terminals of each power transistor only vary between 0 and E/2.

The distribution of the voltages in the ladder configuration of the capacitors can be stabilized and/or adjusted by classic resistances of external equilibrium and/or by an appropriate action of the centralized control unit (modulation of the delays between the successive blocking orders).

The assembly according to the invention in particular can be used in the domains with the following applications: continuous/alternative conversion at a fixed or variable frequency, intermediary conversion at an average frequency of a continuous/continuous conversion system.

Figure 4:
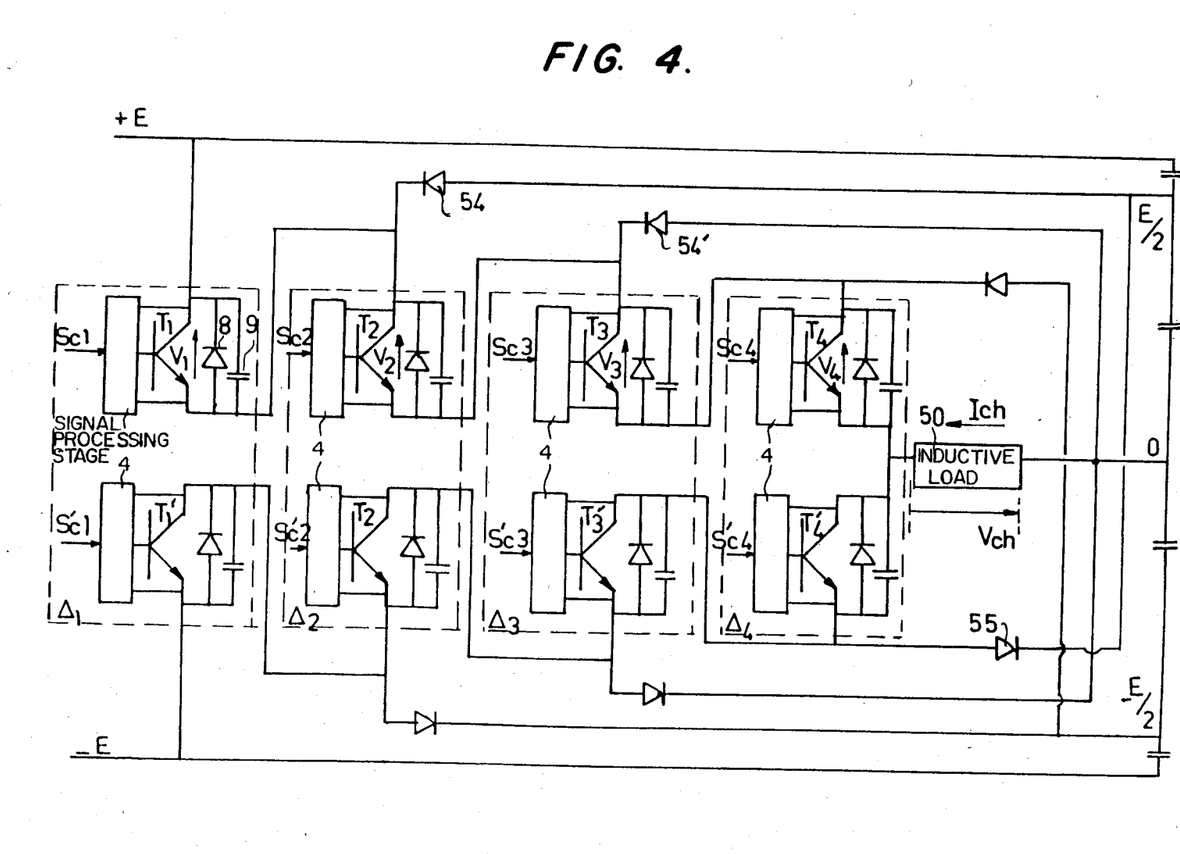
FIG. 4 is a circuit diagram of the conversion apparatus shown in FIG. 2 showing four apparatus ($\Delta$) connected in series.
Figure 6:
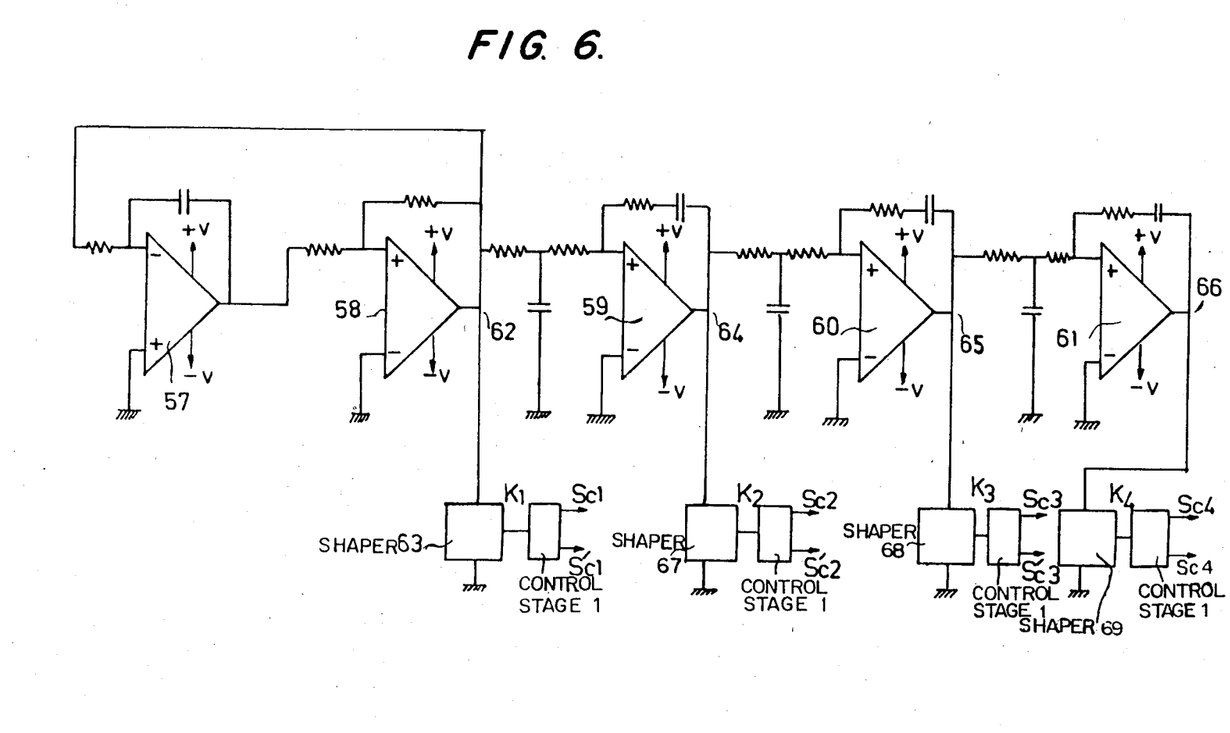
FIG. 6 is a circuit diagram of one embodiment of a centralized control unit driving four control stages associated with four apparatus ($\Delta$)

FIG. 6 illustrates an example of the centralized control unit 56, driving the four control stages 1 of the four apparatus of FIG. 4. The centralized control unit illustrated comprises a plurality of operational amplifiers 57, 58, 59, 60 and 61. Amplifiers 57 and 58, are wired, respectively, as an integrating device and as a voltage comparator. A feedback loop between these amplifiers establish them as an oscillator which delivers, at its output terminal 62, a signal which is applied to shaper 63 which, in turn, drives apparatus $(\Delta_1)$.

Figure 7:
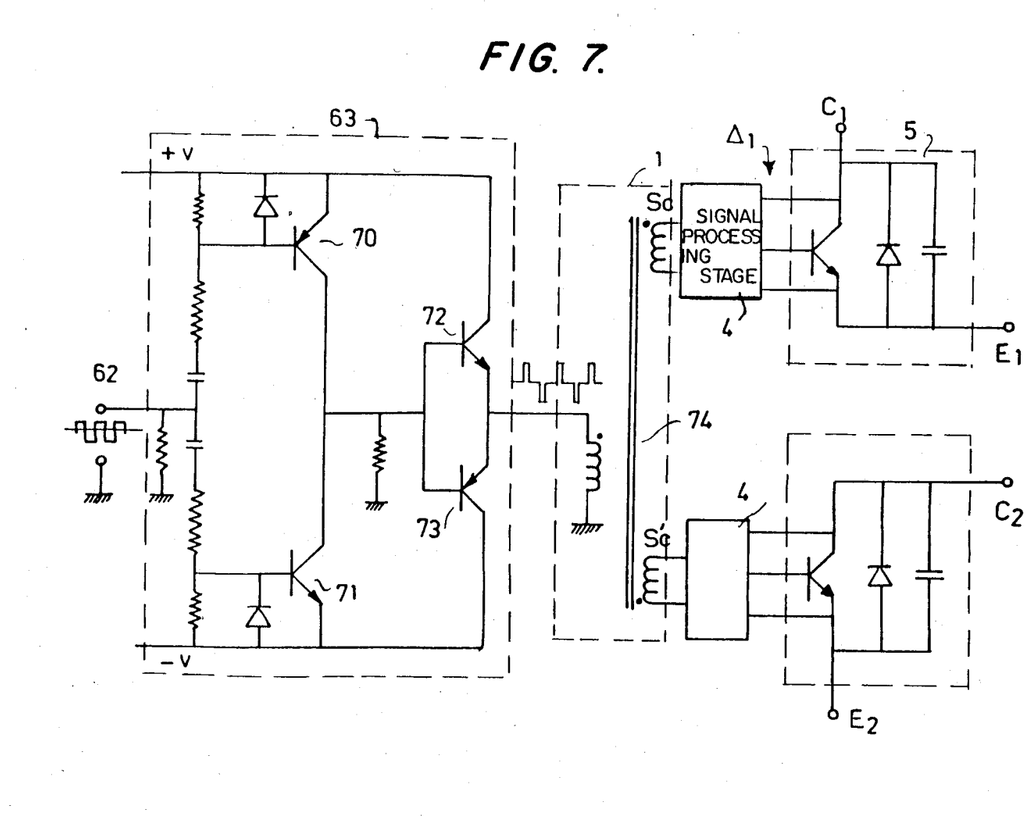
FIG. 7 is a more detailed circuit diagram a subassembly shown in FIG. 6.

Amplifiers 59, 60 and 61 each form dephaser stages whose respective outputs 64, 65 and 66 are applied to shapers 67, 68, 69 before being applied to $(\Delta_2)$, $(\Delta_3)$, and $(\Delta_4)$. FIG. 7 illustrates an example of shaper 63 and of control stage 1. The rectangular signal at output 62 is applied to shaper 63 which performs two differentiations to provide oppositely directed drives to transistors 70 and 71. The pulses issuing from these latter are applied to transistors 72 and 73 which produce alternating pulse train K that constituted the drive for control stage 1.

The pulses thus conformed in the four shapers 63, 67, 68 and 69 illustrated in FIG. 6 are graduated in time with relative delays adjusted by dephasers 59, 60 and 61. The pulse train K issuing from each shaper is delivered to control stage 1. In the example of FIG. 7 this stage is comprised of a pulse transformer 74 having two secondary windings mounted in opposition of phase to respectively deliver the opposite control signals Sc and S'c as is illustrated in FIGS. 5a and 5b.

Although the invention has been described with reference to particular means and embodiments, it is to be understood that the invention is not limited to the particulars disclosed, and extends to all equivalents within the scope of the claims.

We claim:

1. A static semi-conductor electrical energy conversion assembly intended to convert a continuous input voltage into an alternating voltage having a peak-to-peak amplitude lower than or equal to said continuous voltage, said assembly comprising:
    (a) at least two apparatus wherein,
        (i) each apparatus is formed by the association of two converters, each of said converters comprising at least one power stage having at least one controlled blocking static interrupter with a collector, a base and an emitter, and a commutation assist circuit associated with each static interrupter operative to reduce conduction of its collector current during blocking commutations thereof; a control stage adapted to generate a control signal for each static interrupter; an intermediate processing stage associated with each static interrupter having an input connected to the control stage to receive said control signal; and another input connected to said power stage to detect a collector-emitter voltage of each said static interrupter and an output connected to the base of each said static interrupter to trigger the commutations thereof; said intermediate processing stage being adapted to drive the base of each said interrupter so as to interrupt conduction in the single case where, at the same time, said control signal has a value corresponding to a placing in conduction and said collector-emitter voltage is approximately zero whereby reverse polarization of each said interrupter base occurs in all other cases in order to block said interrupter;

(ii) each apparatus formed by the association of said two converters further comprises four power terminals connected to power electrodes of said two static interrupters, said terminals comprising a first collector and a first emitter of the first of said two interrupters and a second collector and a second emitter of the second of said two interrupters, wherein said at least two said apparatus are located in a series, such that said first emitter and said second collector of one apparatus are respectively connected to said first collector and said second emitter of another apparatus, wherein said first collector and said second emitter of said one apparatus receive said continuous input voltage and wherein said first emitter and said second collector of said another apparatus are connected to each other to form a first output terminal of said assembly for connection to a load;

(b) a voltage distribution stage connected to said first collector and said second emitter of each of said apparatus;

(c) a common control stage for controlling in opposition the two converters of each of said apparatus, wherein said common control stage is adapted to generate, for said two static interrupters of said converters, two control signals of opposite phase and of an appropriate form for the conversion to be performed; and (d) a centralized control unit adapted to provide a delay in said two control signals applied to each of said apparatus, wherein said centralized control unit drives each of said apparatus.

2. A conversion assembly according to claim 1 wherein said controlled blocking static interrupters comprise transistors having a voltage at no collector current when said base of said transistors is polarized negatively that is greater than the voltage of said transistors when said base is open.

3. A conversion assembly according to claim 1 wherein said voltage distribution stage has an intermediate terminal for connection to said load.

4. A conversion assembly according to claim 3 wherein said centralized control unit comprises a plurality of dephaser stages, an oscillator for driving said plurality of dephaser stages, and shapers for delivering pulse trains whose individual pulses are delayed in time.

5. A conversion assembly according to claim 4 wherein each of said control stages comprises a pulse transformer having two secondary windings mounted in opposition of phases to deliver said opposite control signals.

6. A conversion assembly according to claim 5 wherein said voltage distribution stage is adapted to divide said continuous input voltage into a plurality of approximately equal fractions each having a value equal to said continuous input voltage divided by the number of said fractions, wherein said number of fractions equals the number of said at least two apparatus, and wherein said voltage distribution apparatus applies said fraction of said voltage to each of said power transistors.

7. A conversion assembly according to claim 6 wherein said voltage distribution stage comprises:

(a) a capacitor assembly mounted in a ladder-like configuration across which said continuous input voltage is applied, said assembly having a plurality of intermediate nodes in order to provide a fraction of said voltage;

(b) an assembly of diodes connected between said nodes of said ladder-like configuration of said capacitors and to said first collector and said second emitter of said two static interrupters in order to apply to said transistors of said static interrupters the distribution of voltage furnished by said ladder-like configuration of said capacitors.

8. A conversion assembly according to claim 7 wherein said capacitors have approximately equal capacities of a high value such that their impedance at the frequency of the commutations of said apparatus is negligible with respect to the impedance of said load.

* * * * *

UNITED STATES PATENT AND TRADEMARK OFFICE
CERTIFICATE OF CORRECTION

PATENT NO. : 4,567,553

DATED : January 28, 1986

INVENTOR(S) : H. FOCH et al.

It is certified that error appears in the above-identified patent and that said Letters Patent is hereby corrected as shown below:

```
     At column 5, line 29 of the printed patent, change
"interrupt" to ---effect---.
     At column 8, line 61 (claim 1, line 26) of the printed
patent, change "interrupt" to ---effect---.
```

Signed and Sealed this

Sixth Day of July, 1993

Attest:

MICHAEL K. KIRK

Attesting Officer

Acting Commissioner of Patents and Trademarks